United States Patent [19]
Westermann

[11] Patent Number: 4,578,737
[45] Date of Patent: Mar. 25, 1986

[54] SYNTHETIC RESIN FILM WOUND CAPACITOR

[76] Inventor: Wolfgang Westermann, Schellingstr. 7, D-6800 Mannheim 1, Fed. Rep. of Germany

[21] Appl. No.: 617,014

[22] Filed: Jun. 4, 1984

[30] Foreign Application Priority Data

Jun. 3, 1983 [DE] Fed. Rep. of Germany ....... 3320257

[51] Int. Cl.[4] ........................ H01G 1/13; H01G 4/08; H01G 7/00

[52] U.S. Cl. .................................. 361/308; 29/25.42; 361/323

[58] Field of Search ........................ 361/301, 306–310, 361/323, 331, 433 W, 433 T; 29/25.42

[56] References Cited

U.S. PATENT DOCUMENTS

| | | | |
|---|---|---|---|
| 3,034,198 | 5/1962 | Rayburn et al. | 361/323 X |
| 3,058,040 | 10/1962 | Wellington | 361/433 T |
| 3,236,936 | 2/1966 | Robinson | 361/308 X |
| 3,766,451 | 10/1973 | Voda et al. | 317/260 |
| 3,849,708 | 11/1974 | Leighton | 361/308 |
| 4,004,200 | 1/1977 | Johanson | 317/242 |
| 4,158,218 | 6/1979 | McLaurin et al. | 361/308 |
| 4,214,353 | 7/1980 | Kalina | 361/308 X |
| 4,255,779 | 3/1981 | Meal | 361/308 |
| 4,510,554 | 4/1985 | Irikura | 361/310 X |

FOREIGN PATENT DOCUMENTS

| | | | |
|---|---|---|---|
| 1554811 | 7/1969 | Fed. Rep. of Germany . | |
| 3134617 | 3/1983 | Fed. Rep. of Germany . | |
| 1089929 | 11/1967 | United Kingdom | 361/308 |
| 1335159 | 10/1973 | United Kingdom . | |

OTHER PUBLICATIONS

Foreign Search Report.

*Primary Examiner*—Donald A. Griffin
*Attorney, Agent, or Firm*—Schwartz, Jeffery, Schwaab, Mack, Blumenthal & Evans

[57] ABSTRACT

Disclosed is a synthetic resin film wound capacitor, in particular a flat wound capacitor in a chip configuration, comprising a casing of a material that retains its shape under the effect of heat, for example a thermosetting synthetic resin, and connecting elements of a thin sheet metal attached to the ends of the capacitor such that sections of which project from the casing and are angled with respect to the frontal side of the capacitor. This synthetic resin film capacitor in a chip configuration resists thermal stresses during the overhead soldering of assembled printed circuits and therefore extends the possible applications of synthetic resin film capacitors. Also disclosed is a process for the manufacture of a capacitor according to the present invention.

20 Claims, 5 Drawing Figures

6
4
5

SYNTHETIC RESIN FILM WOUND CAPACITOR

BACKGROUND OF THE INVENTION

The present invention relates to a synthetic resin film wound capacitor, in particular to a flat wound capacitor comprising a moisture-proof casing and connecting elements fastened to the frontal sides of the capacitor body and projecting through the casing, and a process for the production thereof.

Synthetic resin capacitors, in particular ones with metallized synthetic resin film, have not been used in actual practice as chip structural elements in the past due to their inability to withstand exposure to high thermal stresses encountered during the soldering of assembled printed circuits. Chip elements must withstand, for example, a temperature of approximately 250° C. for 5 seconds, during immersion soldering as a result of direct contact of the entire structural element body with liquid tin solder.

SUMMARY OF THE INVENTION

It is therefore an object of the present invention to provide a synthetic resin film wound capacitor with dimensionally stable connecting elements in a chip configuration.

It is another object of the present invention to provide a capacitor as above that is designed in a simple and cost-efficient manner.

Still another object of the invention is to provide a capacitor as above that is capable of withstanding exposure to the heat of soldering the assembled printed circuits without impairment of its function.

Yet another object of the invention is to provide a capacitor as above which may be readily connected to the printed circuit board by either flow solder or conductor bonding methods.

Still a further object is to provide a process for the manufacture of the capacitor according to the present invention.

In accomplishing the foregoing objects, there has been provided in accordance with one aspect of the present invention, a synthetic resin film flat wound capacitor, which comprises a capacitor body, a moisture-proof casing which surrounds the capacitor and is formed in a chip configuration comprising a material which retains its shape under heat, and a plurality of connecting elements fastened to the frontal side of the capacitor body and projecting through the casing, each connecting element comprising thin sheet metal which is formed such that a first part of the metal is disposed substantially parallel to and adjacent the frontal side of the capacitor body and a second part of the metal projects through the casing at an angle with respect to the frontal side of the capacitor body. The sheet metal used for the connecting elements optimally exhibits relatively poor thermal conductivity and may comprise nickel silver in a thickness of from about 0.1 to 0.5 mm. The first part of the connecting element may cover essentially the entire width and/or height of the frontal side of the capacitor body. The second part of the connecting element is preferably disposed so that it projects outwardly at approximately a right angle to the first part of the connecting element and to the frontal side of the capacitor body. The portion of the second part that extends through the casing is angled again so that it is disposed substantially parallel to and adjacent the outer surface of the casing, wherein the point at which the second part projects through the casing is offset from the midheight of the capacitor casing in the direction of the upper edge of the capacitor, and the second part is angled in the direction of the longer height dimension. The second part of the connector may either terminate flush with the lower edge of the capacitor, or may be bent around the lower edge of the capacitor so that it is perpendicular to the frontal side of the capacitor body and adjacent the lower side of the capacitor.

In accordance with another aspect of the present invention, there has been provided a process for the manufacture of a synthetic resin film wound capacitor, comprising the steps of connecting at least one of said connecting elements to each of two frontal sides of a capacitor body; forming each connecting element so that it projects outwardly at an angle from the respective frontal side of the capacitor body; and providing the capacitor body with a moisture-proof casing comprising a material that will retain its shape when heated and wherein the connecting elements project through the casing.

Further objects, features and advantages of the present invention will become apparent from the following detailed description of preferred embodiments, when considered together with the attached figures of drawing.

DETAILED DESCRIPTION OF PREFERRED EMBODIMENTS

Figure 1A:
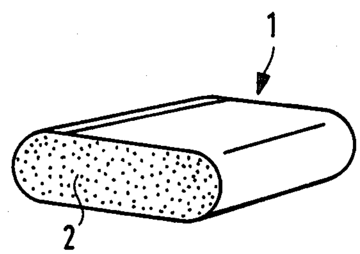
FIGS. 1a to 1e show schematic views, partly in perspective, and partly in section, of a synthetic resin film wound capacitor according to the invention in the course of its preparation and mounting on a printed circuit.

The present invention provides a synthetic resin film wound capacitor, wherein the connecting elements comprise thin sheet metal, preferably from about 0.1 to 0.5 mm thick, preferably distributed essentially over the entire width and/or height of the frontal side contact layer, i.e. normally the Schoop layer of a metalized capacitor. This results in a good mechanical and electrically conducting connection with the frontal contact layer, which is not detrimentally affected by the temperature exposure incurred during the soldering to printed circuits and plates. The air included between the layers of a wound capacitor and the tendency of stretched synthetic plastic film to shrink under temperature exposures, lead to a bulging of the body during the temporary high temperatures occurring during the contact of the liquid solder metal with the body of the capacitor. By applying a casing comprising a material which retains its shape when heated, i.e., a thermosetting plastic, the capacitor body is protected against direct contact with the solder metal. In addition, the shape retaining property of the casing applies a counter pressure to the capacitor tandency of the body to bulge, so that not only its mechanical, but also its electrical properties are preserved. Finally, the shape-retaining casing absorbs heat due to its mass, and its flat connection with the connecting elements enables the conduction of heat away from the body of the capacitor.

According to one advantageous embodiment of the capacitor according to the present invention, the sheet metal of the connecting elements comprises a material having a relatively poor thermal conductivity, for example, nickel silver. This provides an additional means to insure that the heat-sensitive material of the capacitor body will be able to withstand the temperature exposure during immersion soldering without impairment of its function.

According to another advantageous embodiment of the capacitor of the present invention, the casing is uniformly thick on all sides, and a second section of the sheet metal projects through the casing at right angles with respect to the front side of the capacitor body, offset in relation to the midheight of the capacitor. The second section is additionally angled off parallel to the front side of the capacitor, in the direction of the longer height dimension of the capacitor, into a third section of the sheet metal. This arrangement of the third metal section results, on the one hand, in the advantage that more of a solderable surface is available for the soldering process, whereby the risk of the lack of soldering or of shadowing may be kept small. On the other hand, the provision of a third sheet metal section creates an increased length of the connecting path to the winding of the capacitor, thereby impeding the conduction of heat and protecting the capacitor winding against harmful thermal effects.

The third section of the sheet metal preferably terminates flush with the bottom side of the capacitor, if the flow solder method is to be used to electrically connect the capacitor to a printed circuit. If the conductor bonding method is to be used, the third metal section is preferably angled off perpendicularly to the front side, under the bottom side of the capacitor, into a fourth section of the sheet metal. When using the reflow solder method, either one of the embodiments may be used.

The synthetic resin film wound capacitor is prepared according to the present invention by welding or soldering the connecting elements in a first stage to the two frontal sides of the capacitor. The capacitor body is thereafter enveloped in a manner such that a second section of the connecting elements project through the casing at an angle to the frontal sides, wherein the casing is moisture-proof and retains its shape under the effect of heat and the projecting sections of the connecting elements emerging from the casing are positioned so that, in an assembly of printed circuits, they form the solderable connecting sections.

Figure 1B:
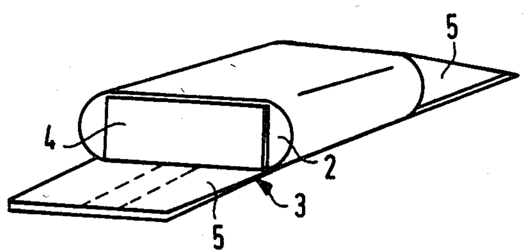

In FIG. 1*a* a bare flat wound plastic capacitor body 1, for example, comprising metallized synthetic resin film, is represented with the frontal sides 2, upon which Schoop layers are located. As seen in FIG. 1*b*, a connecting element 3, made, for example, of nickel silver, in a first section 4 extending essentially over the entire width and/or height of the Schoop layer is welded or soldered onto the frontal side. According to the present embodiment, a second section 5 of the connecting elements 3 is angled off at right angles to the first section 4 of the connecting elements 3 in the outward direction. A narrower sized embodiment of the second section 5 is shown by broken lines. The connecting elements may comprise differing widths, and preferably may have a lesser width in the transition area between the inner and the outer contact layers in order to reduce the transfer of heat.

Furthermore, connecting elements of several separate metal sections may be used, which are all connected on the Schoop layer.

Figure 1C:
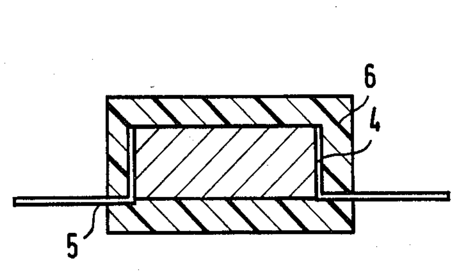
Figure 1D:
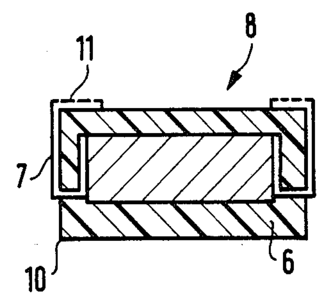

Subsequently, the capacitor body 1, together with the first sections 4 of the connecting elements 3, is provided with a casing 6, which preferably comprises a thermosetting synthetic resin material, such as, for example, hardened epoxy resins, and is uniformly thick on all sides. As seen in the sectional view of FIG. 1*c*, the second sections 5 of the connecting elements 3 project from the casing 6. Finally, the second sections 5 of the connecting elements 3 are again bent by 90° in the direction of the longer height dimension or the direction of the bottom side of the capacitor or the side to be in contact with the printed circuit. The capacitor 8 prepared in this manner is shown in FIG. 1*d* on its top side.

Figure 1E:
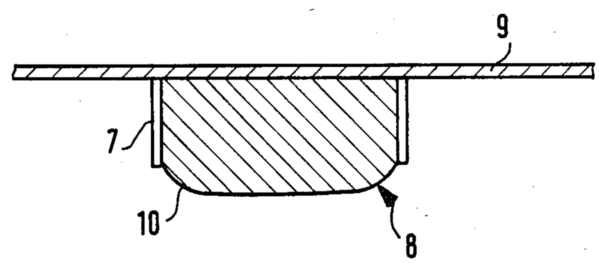

FIG. 1*e* shows schematically a printed circuit board 9 with a capacitor 8 arranged in the downward direction, which is passed through a flow solder bath in this orientation. In order to provide an improved access of the flow of the liquid solder metal to the connecting sections 7 in this overhead soldering process, the top edges 10 of the capacitor 8 are rounded.

If the conductor bonding method (adhesive bonding of the capacitors to the printed circuit by means of conductive epoxy resins) or reflow soldering (reliquifying of the solder paste printed onto the printed circuit by heat) is to be used, it is appropriate to bend the third metal sections 7 again by 90° under the bottom side of the capacitor into a fourth sheet metal section 11.

What is claimed is:

1. A capacitor formed in a chip configuration, which has predetermined electrical properties and shape, comprising:

a capacitor body comprised of a wound body of synthetic resin film;

a moisture-proof casing surrounding the capacitor body, comprising a material which retains its shape under the application of heat; and a plurality of connecting elements fastened to the frontal sides of the capacitor body and projecting through the casing, each of said connecting elements comprising thin sheet metal having relatively poor thermal conductivity, said connecting elements being formed such that a first part of the sheet metal is disposed substantially parallel to and adjacent the frontal side of the capacitor body and a second part of the sheet metal projects through the casing at an angle with respect to the frontal side of the capacitor body, said capacitor retaining said predetermined shape and electrical properties when exposed to temperatures characteristic of liquid solder metal.

2. A capacitor according to claim 1, wherein the sheet metal has a thickness of from about 0.1 to 0.5 mm.

3. A capacitor according to claim 1, wherein the sheet metal comprises nickel silver.

4. A capacitor according to claim 1, wherein the first part of the sheet metal extends essentially over the entire width of the frontal side of the capacitor body.

5. A capacitor according to claim 1, wherein the first section of the sheet metal extends essentially over the entire height of the frontal side of the capacitor body.

6. A capacitor according to claim 1, wherein the casing comprises a substantially uniform thickness on all sides.

7. A capacitor according to claim 1, wherein the second part of the sheet metal which projects through the casing is angled so that it is disposed substantially parallel to and adjacent to the outer surface of the casing.

8. A capacitor according to claim 1, wherein the second part of the sheet metal is disposed at a right angle with respect to the frontal side of the capacitor body and the second part projects through the casing at a point that is offset from the midheight of the capacitor casing in the direction of the upper edge of the capacitor.

9. A capacitor according to claim 8, wherein the distal end of the second part of the sheet metal is angled parallel to the frontal side of the capacitor body and adjacent the outer surface of the casing in the direction of the longer height dimension of the capacitor.

10. A capacitor according to claim 9, wherein the distal end of the sheet metal lies flat against the casing and terminates flush with the lower edge of the capacitor.

11. A capacitor according to claim 9, wherein at least two edges of the capacitor casing are rounded.

12. A capacitor according to claim 9, wherein the distal end of the sheet metal is angled perpendicularly to the frontal side of the capacitor body passing back under the bottom side of the capacitor.

13. A capacitor according to claim 12, wherein the distal end of the sheet metal is disposed parallel to and adjacent to the bottom side of the capacitor.

14. A capacitor according to claim 1, wherein each frontal side of the capacitor body has applied thereto several separate connecting elements.

15. A capacitor according to claim 1, wherein the connecting elements project from the casing on the narrow side of the capacitor body.

16. A capacitor according to claim 1, wherein the casing comprises a thermosetting synthetic resin material.

17. A capacitor according to claim 16, wherein the synthetic resin material can withstand at least 5 seconds at a temperature of about 250° C. without deformation.

18. A capacitor according to claim 16, wherein the casing comprises a hardening epoxy resin.

19. A capacitor according to claim 1, wherein said angle of the second part of the sheet metal with respect to said frontal side is substantially 90°.

20. A process for manufacturing a synthetic resin film wound capacitor, comprising the steps of:

connecting at least one connecting element comprising thin sheet metal to each of two frontal sides of a capacitor body comprised of a wound body of synthetic resin film, said metal having relatively poor thermal conductivity;

forming each connecting element so that it projects outwardly at an angle from the respective frontal side of the capacitor; and providing the capacitor body with a moisture-proof casing comprising a material that will retain its shape under the application of heat, such that the connecting elements project through the casing.

* * * * *